Figure 1:
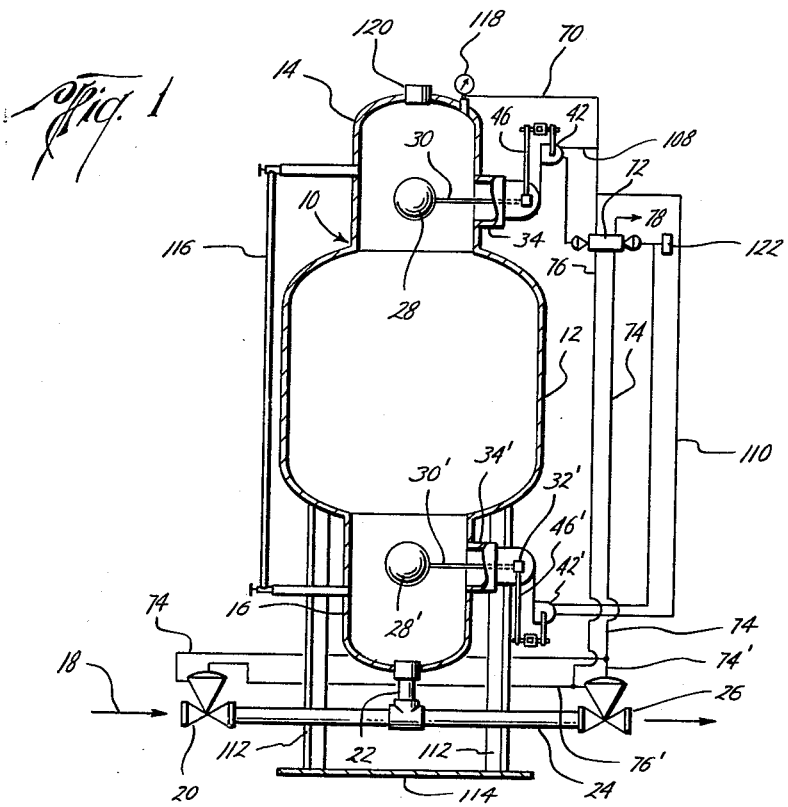

Sept. 18, 1962  H. V. SMITH  3,054,290
DOUBLE FLOAT LIQUID METERING APPARATUS
Filed June 27, 1957  5 Sheets-Sheet 1

Horace V. Smith
INVENTOR.

ATTORNEYS

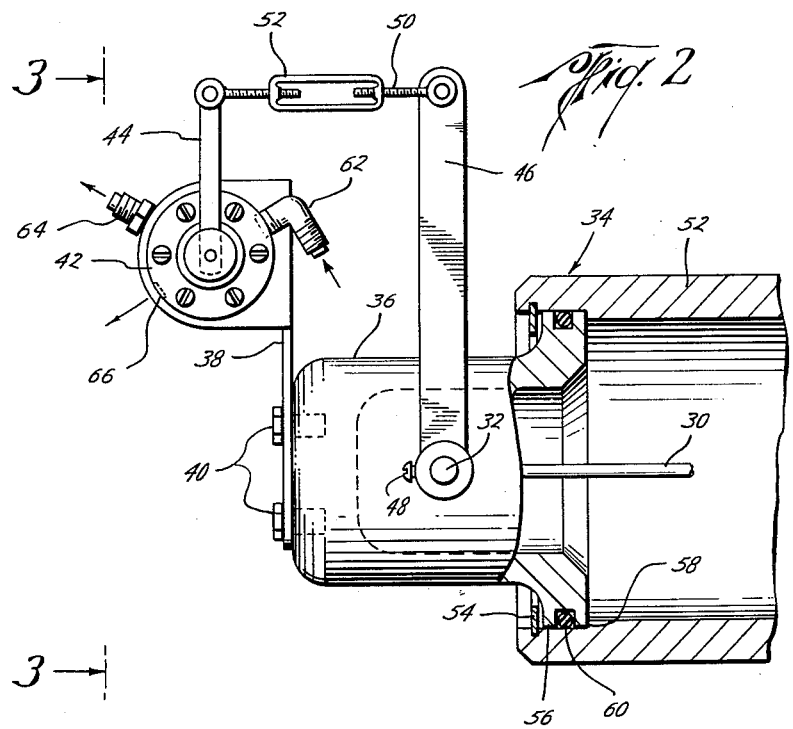
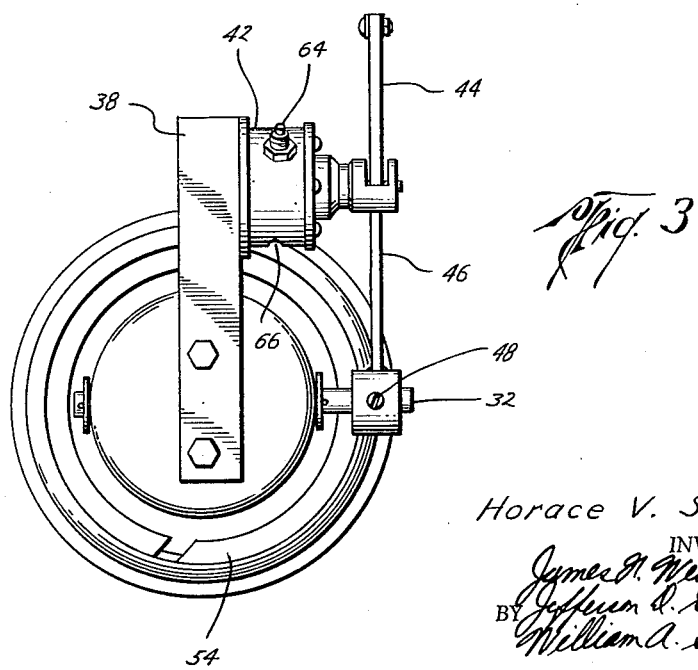

Sept. 18, 1962  H. V. SMITH  3,054,290
DOUBLE FLOAT LIQUID METERING APPARATUS
Filed June 27, 1957  5 Sheets-Sheet 3
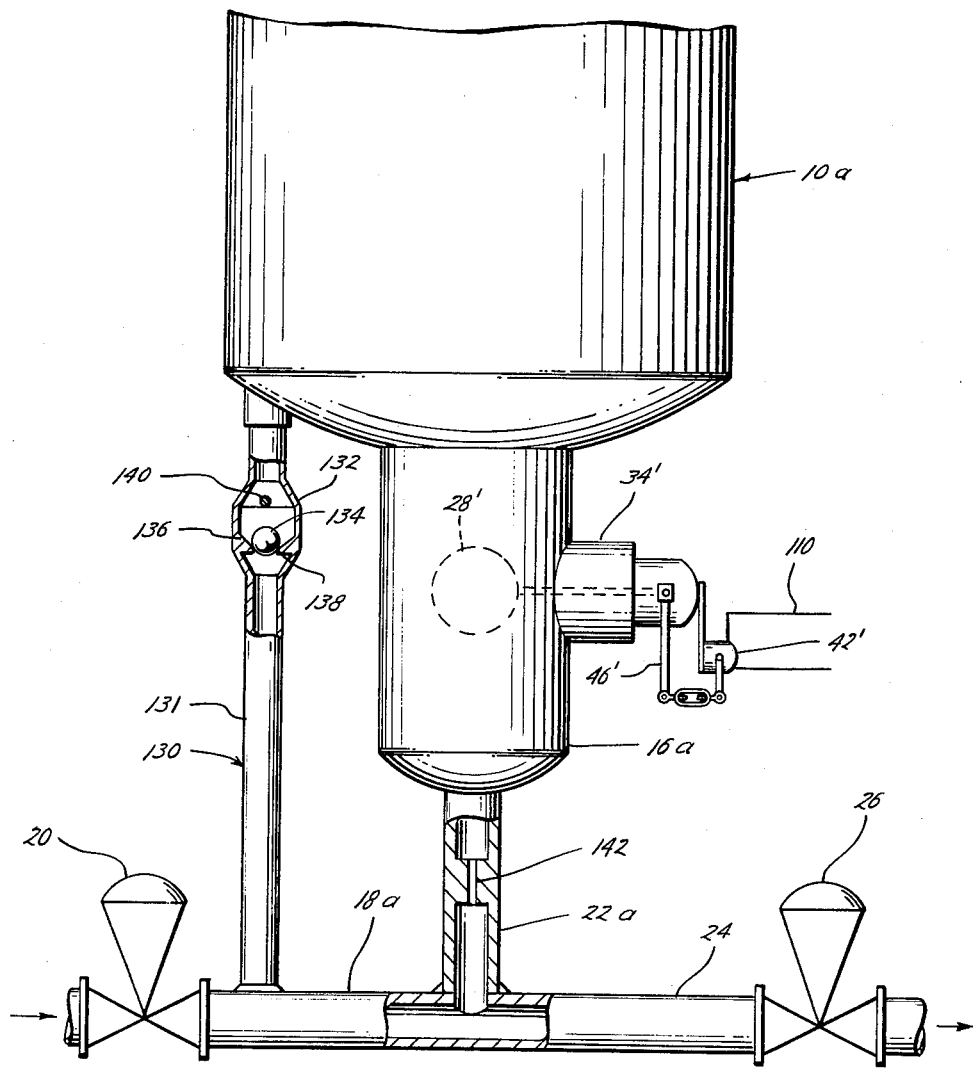
Horace V. Smith
INVENTOR.
BY
ATTORNEYS

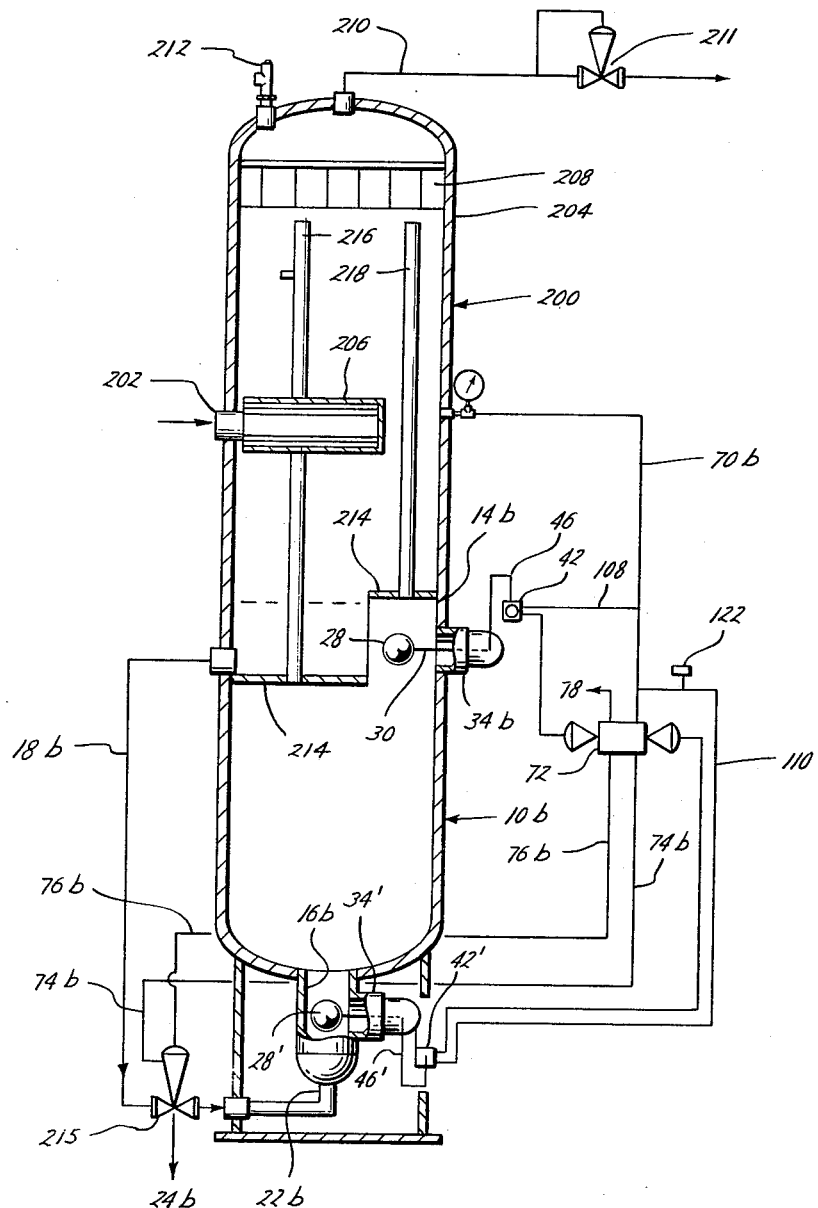

Sept. 18, 1962  H. V. SMITH  3,054,290
DOUBLE FLOAT LIQUID METERING APPARATUS
Filed June 27, 1957  5 Sheets-Sheet 5
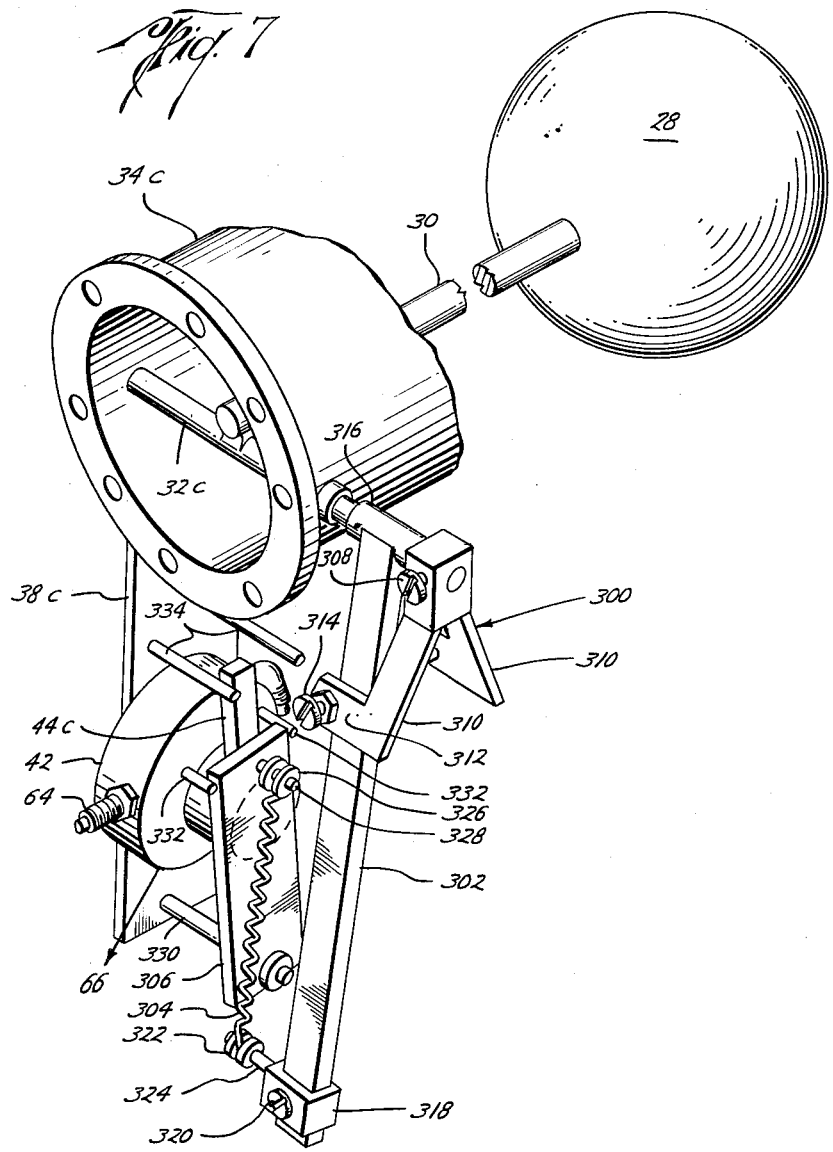
Horace V. Smith
INVENTOR.
BY
ATTORNEYS

# United States Patent Office 3,054,290
Patented Sept. 18, 1962

3,054,290
DOUBLE FLOAT LIQUID METERING APPARATUS
Horace Vernon Smith, Houston, Tex., assignor to Oil Metering and Processing Equipment Corp., Houston, Tex., a corporation of Texas
Filed June 27, 1957, Ser. No. 668,479
5 Claims. (Cl. 73—224)

The present invention relates to an improved liquid metering apparatus and, more particularly, relates to an improved liquid metering apparatus utilizing two floats which apparatus may be used for accurately metering relatively large volumes of liquids under pressure such as in connection with oil and gas wells and gathering systems.

There is need for a highly accurate and efficiently reliable metering vessel particularly for use in connection with metering of oil and water from oil and gas wells or gathering systems. There have been liquid metering apparatus proposed for this use; however, some of these apparatus do not function accurately when metering liquid under pressure and are not capable of accurately metering large volumes of liquid under these conditions. Some metering apparatus can function under pressure and with large volumes of flow; however, these metering apparatus are not as accurate as desired and there is a need for a more accurate and efficiently reliable metering vessel particularly for use in connection with large volumes of liquid flow under pressure. Additionally, it would be highly desirable to be able to calibrate the metering apparatus while in use for accurate adjustment.

Accordingly, it is a major object of the present invention to provide an improved metering apparatus which efficiently and reliably meters large volumes of liquid under pressure such as in connection with metering oil from oil and gas wells and gathering systems therefor and the like.

A further object of the present invention is the provision of a metering apparatus utilizing an upper float in an upper portion of the apparatus to control the upper liquid level and a lower float in a lower portion of the apparatus to control the lower liquid level during filling and emptying of the apparatus.

Another object of the present invention is the provision of a liquid metering apparatus which includes reduced or Seraphin necks extending above and below the main liquid compartment with an upper float in the upper reduced neck controlling the upper liquid level and a lower float in the lower Seraphin neck controlling the lower liquid level during filling and emptying of the apparatus.

Yet a further object of the present invention is the provision of a metering apparatus of the character mentioned which may be incorporated into and form a part of a separator thus forming what may be termed a metering separator particularly suited for separation of oil and gas and metering the liquid therefrom.

Another object of the present invention is to provide in a float controlled liquid metering apparatus a liquid by-pass permitting rapid emptying of an upper portion of the metering chamber and a reduced rate of emptying of the remainder of the chamber thereby preventing harmful effects of a vortex upon the float during the emptying or too rapid emptying and which liquid by-pass may be used to give a rapid filling during the entire filling operation.

Another object of the present invention is the provision of a meter having separate floats controlling the upper liquid level and lower liquid level respectively each of which floats and therefore liquid levels may be separately calibrated.

Yet a further object of the present invention is the provision of such a metering apparatus in which the calibration of the control elements may be effected from the outside so that the metering vessel may be readily calibrated and various repairs made from the outside.

Another object is to provide a novel valve control system controlling independently of each other, upper and lower liquid levels in a metering apparatus.

Yet a further object of the present invention is the provision of such a metering apparatus which is relatively inexpensive to manufacture, maintain and repair and is dependable in operation.

Figure 4:
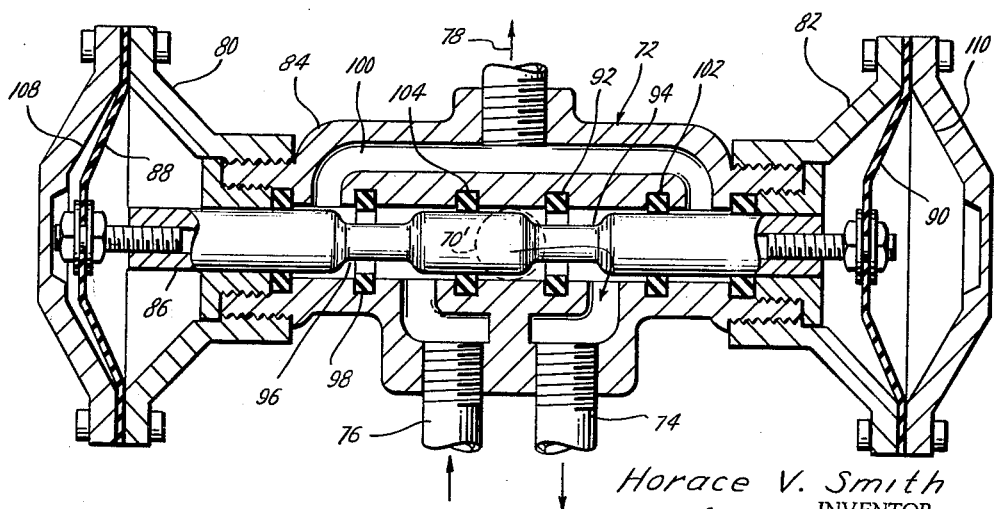

Other and further objects, features and advantages will be apparent from the following description of the presently preferred example of the present invention, given for the purpose of disclosure and taken in conjunction with the accompanying drawings, where like character references designate like parts throughout the several views and where;

FIGURE 1 is a side elevation, partly in section and partly diagrammatic, illustrating the presently preferred form of metering vessel according to the invention, FIGURE 2 is an enlarged view, partially in section, of linkage connecting one of the floats to one of the primary pilot valves, FIGURE 3 is a view along the line 3—3 of FIGURE 2, FIGURE 4 is a cross sectional enlarged view of a pressure responsive pilot valve adapted to simultaneously direct pressure to and drain it from the inlet and outlet valves, FIGURE 5 is an enlarged fragmentary view, partly in section, illustrating the liquid by-pass permitting rapid filling and emptying of the metering chamber, FIGURE 6 is a side elevation, partly in section and partly diagrammatic, illustrating the liquid metering apparatus in combination with an oil and gas separator according to the invention, and FIGURE 7 is a perspective view of a modification illustrating snap acting linkage connecting a float and primary pilot valve.

Referring now to the drawings, and particularly to FIGURE 1, a metering vessel or liquid container 10 is provided which has the main liquid compartment or centrally enlarged body portion 12 with upper and lower Seraphin type necks 14 and 16 respectively of reduced diameter. The reduced diameter liquid compartments or necks 14 and 16 are known in the trade as Seraphin necks in view of the discovery by T. A. Seraphin, U.S. Patent No. 1,277,760 granted September 3, 1918. The shape of the liquid container or metering vessel 10 with the enlarged main liquid compartment 12 and reduced diameter liquid compartments 14 and 16 is standard conventional practice in the art and this particular shape of metering vessel is recommended by the ASME-API Petroleum P.D. Meter Code No. 1101.

A liquid inlet passage or line 18 controlled by an inlet valve element here shown as the inlet valve 20 is connected to the flow line 22 extending into the metering vessel 10 at its lower portion. Similarly, a liquid outlet line or passage 24 controlled by an outlet valve element here shown as the outlet valve 26 is connected to the flow line 22. Thus, upon simultaneous action of the valves 20 and 26 liquid, such as oil, fills and drains from the liquid container or metering vessel 10. As presently described, these valves are simultaneously controlled and the metering vessel may be calibrated to provide a highly accurate and efficient metering of liquid flowing into and out of the metering vessel 10.

Disposed within the upper neck 14 of the liquid container 10 is the upper float 28 connected by linkage to the upper primary pilot valve 42. This linkage includes a float arm 30 rigidly secured at one end to the float 28 (see FIGURE 2) and at its other end to a rock shaft 32 extending out of the cup-shaped cap 36 of the nozzle indicated generally by the numeral 34 extending from the side of the upper neck 14 of the liquid container 10. Thus, as the float 28 rises with rising liquid level in the liquid container 10 the float arm 30 causes rotation of the rock shaft 32. The cap 36 is held in the body 52 of the nozzle 34 by a split ring 54 fitting into an annular groove in the inner wall of the body 52 and bearing against an external shoulder 56 of the cap 36 holding the cap 36 against an internal shoulder 58 of the body 52. Conventional sealing means such as the O-ring 60 may be provided between the cap 36 and body 52 to help prevent the escape of fluids from within the liquid container 10.

Mounted near the upper nozzle 34 such as by the bracket 38 secured to the cap 36 by a pair of bolts 40 is the upper primary pilot valve 42 with its actuating lever 44 (FIGURES 2 and 3) located for pivotal movement perpendicular to the rock shaft 32. This actuating lever 44 of the upper primary pilot valve 42 is adjustably connected to the rock shaft 32 by a connecting link 50 pivotally connected at one end to the actuating lever 44 and at its other end to an upwardly directed arm 46 secured to the rock shaft 32 such as by a set screw 48 for movement with the rock shaft. This link 50 includes a turnbuckle 51 which turnbuckle 51 with the set screw 48 may be used to calibrate the upper liquid level for closing the inlet valve 20 and opening the outlet valve 26 as will be later described. This upper float 28, the linkage, and upper primary pilot valve 42 are included in what may be called an upper float and pilot valve assembly used in controlling the upper liquid level in the liquid container 10.

As shown in FIGURES 2 and 3 the upper primary pilot valve 42 is a two-way pilot valve having an inlet connection 62, an outlet connection 64, and an exhaust port 66. A satisfactory two-way pilot valve is Cla-Val CFI-A1 manufactured by Cla-Val Co., 17th and Placentia Streets, Newport Beach, California. Such two-way pilot valves are commercially available on the market and no further description of this valve is deemed necessary. Movement of the actuating lever 44 of the upper primary pilot valve 42 in one direction by upward movement of the float 28 opens the primary pilot valve 42 to passage of fluid pressure through it and movement of the actuating lever 44 in the other direction closes it to this passage of fluid pressure and permits back pressure at the outlet connection 64 to exhaust out the exhaust port 66.

At the lower end of the liquid container 10 (see FIGURE 1) is provided a lower float and pilot valve assembly identical to the upper float and pilot valve assembly just described (the numbers identifying the same parts shown primed) except that the arm 46' is directed downwardly in an opposite direction from the rock shaft 32' than the arm 46 is from the rock shaft 32. As thus arranged the lower primary pilot valve 42' is opened to flow of fluid pressure through it when the lower float 28' is no longer supported by liquid and is closed except to exhausting pressure when the lower float 28' is supported by liquid. This lower float and pilot valve assembly is used in controlling the lower liquid level in the liquid container 10 by closing the outlet valve 26 and opening the inlet valve 20 as will be presently described.

Refering to FIGURE 1 there is shown schematically an operating pressures system which includes the pressure line 70 in fluid communication with the upper portion of the liquid container 10, a pressure responsive pilot valve 72 connected to the pressure line 70 to alternately direct pressure to and bleed it from the inlet and outlet valves 20 and 26 (here illustrated as double acting diaphragm and motor valves) through the pressure lines 74 and 74', and 76 and 76'.

Referring now to FIGURE 4 there is illustrated in detail the pressure responsive pilot valve 72 here shown as a double diaphragm four-way valve including a lefthand diaphragm assembly 80 and a righthand diaphragm assembly 82. Contained in the housing 84 of this pressure responsive pilot valve 72 is the horizontal valve stem 86 connected at its left end to the flexible diaphragm 88 in the left diaphragm assembly 80 and connected at its right end to a flexible diaphragm 90 in the righthand diaphragm assembly 82. In the position shown in FIGURE 4 pressure has been applied to the outside of the righthand diaphragm 90 and bled from the outside of the lefthand diaphragm 88 forcing the valve stem 86 to the left position. By bleeding pressure from the righthand diaphragm assembly 82 and applying it to the lefthand diaphragm assembly 80 the valve stem 86 will be reciprocated to the right. In the position illustrated in FIGURE 4 gas pressure line 70 passes to the right between the bushing 92 and the righthand reduced portion 94 of the valve stem 86 into the pressure line 74 connected to the underside of the diaphragm (not shown) of the inlet valve 20 opening this inlet valve 20 and through the pressure line 74' to the upper side of the diaphragm (not shown) of the outlet valve 26 closing it. Pressure in pressure line 76 from the lower side of the diaphragm (not shown) of the outlet valve 26 and in pressure line 76' from the upper side of the diaphragm (not shown) of the inlet valve 20 drains between the lefthand reduced portion 96 of the valve stem 86 and the bushing 98, through the exhaust passage 100 and out the exhaust port 78. In this position illustrated in FIGURE 4 pressure from the pressure line 70 is prevented from entering the exhaust passage 100 because of the close fit of the bushing 102 around the valve stem 86 and is prevented from entering the pressure line 76 because of the close fit between the bushing 104 and the valve stem 86. When the valve stem 86 is reciprocated to the right fluid pressure entering the pressure port 70' will then pass between the left hand reduced portion 96 of the valve stem 86 and the bushing 104 into line 76 with escape of this pressure through the outlet passage 100 prevent by close fit of the bushing 98 around the valve stem 86. In this same position of the valve stem 86 the bushing 92 will closely fit around the valve stem 86 preventing any pressure from the pressure port 70' entering into the pressure line 74 and pressure in the pressure line 74 will exhaust between the right hand reduced portion 94 of the valve stem 86 and the bushing 102 into the exhaust passage 100 and out the exhaust port 78. Thus, as the valve stem is reciprocated pressure from the pressure line 70 will be alternately directed through the pressure lines 74 and 74' and 76 and 76' to opposite side of the diaphragms of the inlet valve 20 and outlet valve 26 and simultaneously bled from the other side of their diaphragms thereby simultaneously opening one such inlet or outlet valve and closing the other inlet or outlet valve.

The pressure responsive pilot valve 72 may be of any preferred type of which several are readily available on the commercial market. A satisfactory valve is the four-way valve model 62—28–62 of Valvair Corporation, 454 Morgan Avenue, Akron 11, Ohio, with double diaphragms. Accordingly, no further description thereof is necessary.

The inlet and outlet valves 20 and 26 may be of any preferred type of pressure responsive valves such as double acting or single acting diaphragm motor valve of which many are commercially available and accordingly no further description of them is necessary. If single acting diaphragm valves are used then the pressure lines 74' and 76' may be eliminated as pressure operates such valves in one direction and draining pressure operates them in another direction.

Referring now to FIGURES 1 and 2, a control pressure system is provided to operate the pressure responsive pilot valve 72. This includes a pressure line 108 connected at one end to a source of pressure such as the pressure line 70 which pressure line 108 passes through the upper primary pilot valve 42 by means of the pressure inlet connection 62 and pressure outlet connection 64. The other end of this pressure line 108 is connected to the left hand diaphragm assembly 80 (FIGURE 4) to supply pressure to and bleed it from this lefthand diaphragm assembly 80. Similarly, another pressure line 110 is connected to a pressure source such as the pressure line 70 and is passed through the lower primary pilot valve 42' to the righthand diaphragm assembly 82 of the pressure responsive pilot valve 72. As thus arranged, when the lower primary pilot valve 42' is open so that fluid pressure may flow through the pressure line 110 against the righthand diaphragm 90 the valve stem 86 of the pressure responsive pilot valve 72 is moved to the left and fluid pressure to the left of the lefthand diaphragm 88 is exhausted out the pressure line 108 and the exhaust port 66 (FIGURE 2) of the upper primary pilot valve 42. Likewise, when the upper primary pilot valve 42 is open and the lower primary pilot valve 42' is closed pressure will be applied to the lefthand diaphragm 88 moving the valve stem 86 to the right exhausting pressure out pressure line 110 and the lower primary pilot valve 42'.

The liquid container 10 may obviously be supported by any suitable framework or structure and for this purpose the supports 112 and the base 114 (see FIGURE 1) are illustrated. A conventional liquid level gauge 116 is provided to indicate the liquid level in the liquid container 10 and a pressure gauge 118 indicates pressure in the liquid container 10. Also provided at the top of the liquid container 10 is a gas equalizing connection 120.

A dump counter or recorder mechanism, of any preferred type, is provided and generally designated by the reference numeral 122, so that an accurate count is automatically maintained of each time the liquid container 10 fills and empties. The counter 122 is diagrammatically illustrated and any conventional counter or recorder mechanism may be used, a number of which are on the commercial market and, accordingly, no further description thereof is deemed necessary.

The operation of the liquid metering apparatus of FIGURES 1 through 4, inclusive, is as follows: liquid, such as oil, water, or mixtures thereof, is permitted to enter the inlet line 18 when the inlet valve 20 is open, which liquid in turn flows in flow line 22 up into the interior of the liquid container 10, the outflow valve 26 being closed. As the liquid rises in the liquid container 10 the lower float 28' will rise until the lower float arm 30' strikes the nozzle 34' during which movement of the lower float 28' the linkage will close the lower primary pilot valve 42' to the flow of pressure of pressure line 110 through it and will open its exhaust port. The liquid level continues to rise until it reaches the upper float 28 which float will rise rotating the rock shaft 32 moving the arm 46 and link 50 to open the upper primary pilot valve 42 to the flow of pressure through it from the pressure line 108 and closing its exhaust port 66. The gas pressure then flowing through the line 108 forces against the lefthand diaphragm 88 of the pressure responsive pilot valve 72 moving the valve stem 86 to the right exhausting the pressure on the right of the righthand diaphragm 90 out the pressure line 110 and lower primary pilot valve 42'. When the valve stem 86 moves to the right gas pressure from the line 70 passes through the pressure responsive pilot valve 72 and the pressure line 76 to the outlet valve 26 opening it and the pressure line 76' closing the inlet valve 20. The same movement of the valve stem 86 to the right permits a pressure in the lines 74 and 74' from the inlet valve 20 and outlet valve 26 to be exhausted out the exhaust port 78.

The liquid in the liquid container 10 then drains out the flow line 22 and outlet line 24 through the open outlet valve 26 causing the upper float 28 to lower until the float arm 30 strikes the bottom of the nozzle 34. As the float 28 lowers it operates the linkage to close the upper primary pilot valve 42 to the flow of pressure in line 108 through it and opens the exhaust port 66 to pressure in the pressure line 108. As the liquid level in its downward movement reaches the lower float 28' this lower float will fall with the liquid level causing movement of its linkage to open the lower primary pilot valve 42' to the flow of pressure through the pressure line 110 against the righthand diaphragm 90 of the pressure responsive pilot valve 72 moving the valve stem 86 to the left exhausting the pressure on the left of the lefthand diaphragm 88 out the pressure line 108 and pressure port 66 of the upper primary pilot valve 42. When this occurs pressure entering the pressure responsive pilot valve 72 passes into the pressure line 74 to the inlet valve 20 opening it and through the pressure line 74' to the outlet valve 24 closing it and pressure to the pressure lines 76 and 76' is cut off opening these pressure lines to the exhaust port 78 whereupon the liquid container 10 again begins to refill. Thereafter the cycle is repeated.

As thus constructed the upper float and pilot valve assembly and the lower float and pilot valve assembly may be calibrated and adjusted entirely independent of one another. Further, the upper and lower floats 28 and 28' do not leave the upper and lower reduced diameter necks 14 and 16 so that greater accuracy of the control of the upper liquid level is obtained. While the Seraphin shaped liquid container 10 is preferred, the upper and lower necks 14 and 16 may be eliminated and satisfactory results in most operations will still be provided.

Referring now to FIGURE 5 there is shown a modification of the form of liquid metering apparatus which modification permits a rapid filling of the liquid container 10a and a rapid emptying of this liquid container 10a until a predetermined point above the lower float 28' is reached at which time the rate of drainage is lessened thereby preventing erroneous metering results caused by a vortex formed in the liquid leaving the liquid container 10a. All parts in the modification which are identical to those shown in FIGURE 1 have the same numbers and those which are modified are suffixed by the letter "a."

Connected to the flow lines between the inlet valve 20 and outlet valve 26, such as in the inlet line 18a, and to a lower portion of the liquid container 10a above the lower float 28' is a liquid by-pass 130. This liquid by-pass includes the pipe 131 in which is a float chamber 132 of enlarged diameter from the rest of the pipe 131. Freely movable in this float chamber 132 is a check float in the form of a ball 134 adapted to seat in a tapered valve seat 136 in the lower portion of the float chamber 132. The tapered valve seat 136 has a passage 138 through it which is closed by the ball 134 when in the position illustrated in FIGURE 5. In the float chamber 132 above the ball 134 is a stop pin 140 which limits the upward movement of the ball 134 preventing it from sealing the upper end of the float chamber 132. This ball 134 is of sufficient buoyancy and the difference between its diameter and the diameter of the float chamber 132 sufficiently great that the buoyancy of the ball overcomes the tendency of descending liquid in the float chamber 132 to seat the ball in the valve seat 136.

The flow line 22a connected to the inflow line 18a and the outflow line 24 has a decreased internal diameter from the flow line 22 shown in FIGURE 1 which decreased internal diameter may be provided by the restriction 142.

In operation of this modification shown in FIGURE 5 when the inlet valve 20 is open and the outlet valve 26 closed liquid in the inlet line 18a rapidly enters the liquid container 10a through both the flow line 22a and the liquid by-pass 130—the pin 140 preventing the ball 134 from floating upwardly to a position where it can seal the pipe 131. When the inlet valve 20 is closed and the outlet valve 26 opened, a rapid drainage is permitted by liquid flowing through both the flow line 22a and the liquid by-pass 130. During this draining of liquid from the liquid container 10a the ball 134 which is adapted to float in the liquid being metered will float in the float chamber 132 above its valve seat 136 permitting the liquid in the liquid container 10a to pass through the port 138 in the valve seat 136. After the draining liquid uncovers the upper end of the liquid by-pass 130 the liquid in the by-pass will continue to drain until the float chamber 132 is emptied causing the ball 134 to seat on the valve seat 136 preventing any further flow of liquid through the liquid by-pass 130. After the upper end of the liquid by-pass 130 is uncovered liquid drained from the liquid container 10a must pass through the flow line 22a. The rate of flow downwardly through the flow line 22a is sufficiently slow that no vortex will be formed in the liquid and the rate of fall of the liquid level will decrease so the lower float 28' may accurately close the outlet valve 26 and open the inlet valve 20. Because the liquid container 10a normally fills by gravity and drains under gravity plus a pressure differential, the liquid container 10a normally empties faster than it fills and therefore the speed of filling need not be further reduced to obtain accurate metering.

If the pressure differential between the liquid in the liquid container 10a and the downstream side of the outlet valve 26 is such that the liquid drains from the liquid container 10a by gravity, then the float chamber 132 and ball 134 may be omitted as the liquid level in the pipe 131 will be the same as in the liquid container 10a and will thus not fall below the liquid level at which the outlet valve closes and the inlet valve 22 opens. However, as pressure above the liquid in the liquid container 10a is often considerably in excess of that down stream of the outlet valve 26 this ball 134 seating on the valve seat 136 prevents the gas pressure in liquid container 10a from blowing the liquid out of the liquid by-pass 130 and this gas from entering the outlet line 24. Because of the resistance to flow through the flow line 22a caused by the restriction 142, liquid under great pressure in the liquid by-pass 130 of larger diameter than the restriction 142 could be blown out of the liquid by-pass 130 and gas enter the outlet line 24 if it were not for this ball 134 and the valve seat 136. Also, the valve seat 136 is preferably located above the liquid level at which the float 28' will cause the outlet valve 26 to close and the inlet valve 20 to open so that regardless of the amount of pressure on liquid in the liquid container 10a drainage through the liquid by-pass 130 is always stopped at a predetermined level. If the valve seat 136 were not so located and the system operated under varying pressures in the liquid container 10a, with lower pressures the liquid in the liquid by-pass 130 might not reach the tapered seat 136 while it would at higher pressures thus giving a different volume of liquid draining under varying pressures from the liquid container 10a and resulting inaccuracies in the metering.

While the modification of the liquid by-pass 130 has been illustrated with a liquid metering apparatus having the lower liquid level controlled by a lower float and an inlet and an outlet valve it may also be used in other forms of metering apparatus. For example, it may be used where a single 3-way valve is used as illustrated in U.S. Patent #2,211,282 granted August 13, 1940 to R. S. McKeever for Liquid Transferring Apparatus, or where divided buoyancy masses rigidly connected together are used as illustrated in the co-pending application Serial Number 517,629 for Liquid Metering Apparatus now matured into U.S. Patent No. 2,853,877 granted to Horace V. Smith for Liquid Metering Apparatus.

Referring now to FIGURE 6 there is illustrated a metering separator 200 in which parts that are the same as in FIGURE 1 bear the same numbers as in FIGURE 1, in which modified parts have the suffix letter "b," and in which new or additional parts are indicated by numbers above 200.

The metering separator 200 has the well fluid inlet 202 for introducing the well fluid into the separator chamber 204. A degassing element 206 is provided so that gas flows upwardly through a conventional screen or mist extracting element 208 and out the gas outlet line 210 through a back pressure valve 211. A pressure gauge not shown as well as a relief valve 212 may be provided at the upper end of the separator chamber 204.

A partition 214 is provided in the metering separator 200 forming the bottom of the separator chamber 204 and the top of the liquid container 10b providing what might be termed a liquid accumulating portion at the lower end of the separator chamber 204. Thus as oil and gas flow into the separator chamber, the gas flows out the outflow line 210 and oil collects in the lower portion of the separator 204. A discharge line 18b, which also serves as an inlet line to the liquid container 10b supplies oil from the separator chamber 204 to the liquid container 10b in response to actuation of an inlet valve element here included in a 3-way valve 215 which contains both inlet and outlet valve elements. Thus, the liquid container 10b in effect forms a lower portion of the metering separator 200.

The upper neck 14b of the liquid container 10b is located adjacent an exterior wall of the metering separator 200 rather than being centrally located as illustrated in FIGURE 1, so the upper nozzle 34b may be conveniently located exterior of the liquid container 10b. Gas equalizing lines 216 and 218 are provided between the liquid container 10b and the upper portion of the separator chamber 204. The pressure line 70b is connected to the separator chamber 204 above the level of liquid in that separator chamber. Thus, as the upper and lower floats 28 and 28' are actuated in response to the inflow and outflow of liquid in the liquid container 10b, the combined inlet and outlet 3-way valve 215 is operated to permit a filling and emptying of the liquid container 10b in a similar manner as described in relation to the structure of FIGURE 1. While liquid is emptying from the liquid container 10b liquid has been accumulating in the separator chamber 204. When the 3-way valve 215 is opened to the line 18b and closed to the outlet line 24b, this liquid flows into the liquid container 10b.

The 3-way valve 215 is a pressure responsive valve of which many are readily available commercially. In one position it allows liquid to enter the liquid container 10b and prevents it from draining therefrom. In another position it permits drainage from the liquid container 10b out the outlet line 24 and prevents filling of the liquid container 10b. No further description of this 3-way valve 215 is necessary. The particular 3-way valve 215 here illustrated is a double acting motor diaphragm valve with pressure being applied to and drained from opposite sides of its diaphragm (not shown) by the pressure lines 74b and 76b from the pressure responsive pilot valve 72.

Other than these differences the control mechanism and mode of operation are the same as that described in connection with FIGURES 1 through 4 and no more detailed description is deemed necessary.

While the structure shown in FIGURES 1 through 4 and in FIGURE 6 have been described as operating at above atmospheric pressure, it may be in certain instances that they will be operated at atmospheric pressure or less in which event extraneous gas at a suitable pressure may be supplied to the pressure line 70 FIGURES 1 through 4 or 70b of FIGURE 6 for actuation of the inlet and outlet valves 20 and 26.

Referring now to FIGURE 7 there is illustrated a modification of the linkage of actuation of a primary pilot valve by a float here illustrated as the upper float 28 and the primary pilot valve 42. The parts here which are the same as in FIGURES 1 through 4 bear the same numbers as such figures, modifications bear the suffix letter "c" and other parts are indicated by numbers above 300. Rapid flow into and out of the liquid container 10 and the use of separate floats 28 and 28' normally eliminate the need of any snap action to the linkage, but where flow rates are low a snap acting linkage may be desirable.

The modification of FIGURE 7 illustrates a snap acting device for snapping the upper primary pilot valve 42 from open to closed and from closed to open position which prevents, without the addition of friction, "creeping" of the primary pilot valve 42 and any resultant creep that might result in the pressure responsive pilot valve 72.

This snap acting mechanism includes as a whole the rock shaft 32c mounted for oscillating rotatable movement through the tubular nozzle 34c opening into the liquid container 10, not shown; an adjustable engaging member 300 secured on the end of the rock shaft 32c extending from the nozzle 34c; a swing arm 302 pivotally mounted on the rock shaft 32c for independent rotation therewith; and resilient tension linkage 304 adjustably secured to the swing arm 302 and to a pivot arm 306 moving the actuating lever 44c of the upper primary pilot valve 42.

The rock shaft 32c is pivotally mounted in any conventional manner and is oscillatably rotated by movement of the float 28 on the float arm 30 which is rigidly secured to the rock shaft 32c. Thus, in this example, as the float 28 rises and falls with changes of liquid level the float arm 30 causes an oscillating rotation of the rock shaft 32c.

The engaging member 300 is secured, such as by a set screw 308, to be end of the rock shaft 32c extending from the nozzle 34c for rotation therewith and includes a generally U-shaped bracket formed of a pair of generally L-shaped brackets 310. Disposed on the free end 312 of each L-shaped bracket 310 is a contact screw 314 by which suitable adjustment may be made for calibrating the snap acting mechanism as will be presently described. Rotatably secured at its upper end, such as by the journal bearing 316, and passing between the L-shaped brackets 310 is the downwardly extending swing arm 302 on the lower end of which is a slidable sleeve 318 which may be secured in any position along the arm 302 by means of the adjusting screw 320. A rotatable sleeve 322 to help reduce friction is secured on a pin 324 secured to and extending from the slidable sleeve 318. One end of the resilient tension linkage such as a tension spring 304 is secured in a groove on this rotatable sleeve 322 and the upper end is secured in a similar grooved rotatable sleeve 326 attached to a pin 328 extending from the pivot arm 306. The pivot arm 306 is pivotally mounted such as by the shaft 330 mounted in the bracket 38c securing the upper primary valve 42 to the upper nozzle 34c. Secured to and projecting from the upper end of the pivot arm 306 is a pair of spaced projections 332 forming contact members that straddle the pilot actuating lever 44c of the pilot valve 42 and strike the pilot actuating lever 44c when the pivot arm 306 is moved from side to side thereby moving the pilot actuating lever 44c and actuating the pilot valve 42.

It is to be noted that the tension spring 304 is connected to the swing arm 302 on one side of the shaft 330 forming the pivot point of the pivot arm 306 and connected to the pivot arm 306 on the other side of the shaft or pivot. Thus the tension of the spring 304 tends to hold the pivot arm 306 on whatever side of the shaft 330 the lower end of the spring 304 is at that time.

To prevent the pivot arm 306 from damaging the pilot valve 42 when the pilot actuating lever 44c is thrown from side to side by the projections 332, a pair of stops extends outwardly from the bracket 38c on each side of the pilot actuating lever 44c. These stops 334 are spaced so that the pilot actuating lever 44c has sufficient movement to operate the pilot valve 42, but are placed close enough together to prevent damage to the pilot valve 42.

In operation of the snap acting mechanism, the rock shaft 32c is oscillatably rotated by vertical movement of the float 28. A corresponding movement is transmitted to the L-shaped brackets 310 causing inner ends of alternate contact screws 314 after predetermined movement to contact the swing arm 302 and swing it first in one direction and then in the other in response to the movement of the float 28 as described. As the swing arm 302 moves from one side to another the tension on the spring 304, when it passes the straight line through the shaft 330 and the pin 328, snaps the pivot arm 306 from one extreme position to the other. As the pivot arm 306 is oscillated on its shaft 330, the projections 332 strike the pilot actuating lever 44c actuating the primary pilot valve 42.

It will be noted that the projections 332 are spaced farther apart than the width of the pilot actuating lever 44c so that only one such projection 332 is in contact with the pilot actuating lever 44c at any one time and there is a space between the pilot actuating lever 44c and the other projection 332. Because the pivot arm 306 contacts the pilot actuating lever 44c only by the projections 332, if there should be any creeping of the pivot arm 306 before the spring 304 passes the shaft 330 such motion is not transmitted to the pilot actuating lever 44c because the particular projection 332 which will strike the pilot actuating lever 44c is spaced from it. Thus lost motion between the pivot arm 306 and the pilot actuating lever 44c in the event there should be any creeping of the pivot arm 306, together with the action of the spring 304, prevents any creeping of the primary pilot valve 42 and this primary pilot valve is snap acted by the striking of one of the projections 332 when the tension of the spring 304 finally snaps the pivot arm 306.

Varying the distance between the inner ends of the contact screws 314 and the swing arm 302 calibrates the snap acting mechanism by varying the angular rotation of the rock shaft 32c necessary to cause contact between the engaging member 300 and the swing arm 302. Also, adjustment of the slidable sleeve 318 along the swing arm 302 adjusts the tension on the spring 304.

A similar snap acting linkage may also be used with the lower float 28'.

This particular snap acting mechanism is disclosed and claimed in Patent No. 2,818,738 granted January 7, 1958 upon the application of Horace V. Smith and George A. Repal for Snap Acting Mechanism.

While the present invention has been described in connection with metering and separating oil and gas, it will be understood that the invention may be used for metering any type of liquid under any and all pressure conditions and in combinations with various other apparatus. Numerous rearrangements of parts and substitutions of parts will readily suggest themselves to those skilled in the art which are encompassed within the spirit of the invention and the scope of the appended claims.

The present invention therefore is well suited to carry out the objects and attain the advantages and ends mentioned as well as others inherent therein. Accordingly, the invention is to be limited only by the spirit thereof and the scope of the appended claims.

What is claimed is:

1. In a liquid metering apparatus including a liquid container having liquid passage means, a valve assembly having inlet and outlet valve elements associated with the liquid passage means whereby the liquid container is alternately filled and drained of liquid and a control system operating the valve assembly to stop draining of the liquid container in response to action on a float by a liquid level in a lower portion of the liquid container, the improvement comprising a liquid by-pass passage between the liquid container above that position of the float at which it stops drainage of the liquid container and the liquid passage means between said valve elements.

2. The improvement of claim 1 in which the liquid by-pass passage includes a float chamber, a valve seat in the float chamber, and a float valve in the float chamber above the valve seat adapted to float in liquid in the float chamber and seal the valve seat when no liquid is in the float chamber.

3. The invention of claim 2 in which the valve seat is located on a higher plane than that in which movement of the float in the liquid container operates the valve assembly to stop drainage of the liquid container.

4. A liquid metering apparatus comprising, a liquid container having inlet and outlet passages and inlet and outlet valve elements therein; an upper float in an upper portion of the liquid container and a lower float in a lower portion of the liquid container each said float movable by buoyancy of liquid in the liquid container; valve control means actuated by the upper float upon liquid level in the container reaching a predetermined upper level to simultaneously open the outlet valve and close the inlet valve elements, and actuated by the lower float upon the liquid level in the container reaching a predetermined low level to simultaneously close the outlet valve and open the inlet valve elements; and a liquid by-pass passage between the liquid container above that position of the lower float at which the outlet valve element closes and the outlet passage upstream from the outlet valve element.

5. The invention of claim 4 in which the liquid by-pass passage includes a float chamber, a valve seat in the float chamber, and a float valve in the float chamber above the valve seat adapted to float in liquid in the float chamber and seal the valve seat when no liquid is in the float chamber.

References Cited in the file of this patent

UNITED STATES PATENTS

| | | |
|---|---|---|
| 936,358 | Rak | Oct. 12, 1909 |
| 2,158,381 | Raymond | May 16, 1939 |
| 2,211,282 | McKeever | Aug. 13, 1940 |
| 2,794,342 | Franklin | June 4, 1957 |
| 2,831,350 | Banks et al. | Apr. 22, 1958 |
| 2,872,817 | Pitts | Feb. 10, 1959 |
| 2,936,622 | Glasgow | May 17, 1960 |

OTHER REFERENCES

A publication in The Oil and Gas Journal, (pp. 111–117), Oct. 17, 1955 (Photo copy in Division 36), 73–221.

A publication in The Oil And Gas Journal May 6, 1957, vol. 55, No. 18, (pp. 98–109). (Copy in Scientific Library and photo copy in Division 36), 73–224.

UNITED STATES PATENT OFFICE
CERTIFICATE OF CORRECTION

Patent No. 3,054,290                      September 18, 1962

Horace Vernon Smith

It is hereby certified that error appears in the above numbered patent requiring correction and that the said Letters Patent should read as corrected below.

Column 4, line 20, after "pressure" insert -- entering the inlet port 70′ connected to the pressure --.

Signed and sealed this 9th day of April 1963.

(SEAL)
Attest:

ESTON G. JOHNSON                        DAVID L. LADD

Attesting Officer                         Commissioner of Patents